United States Patent [19]

Schmidt

[11] 4,106,527
[45] Aug. 15, 1978

[54] REINFORCED FLEXIBLE CONDUIT AND METHOD OF MANUFACTURE

[76] Inventor: Erich Schmidt, Hoffeldstrasse 45a, 4 Dusseldorf, Germany

[21] Appl. No.: 513,823

[22] Filed: Oct. 10, 1974

[30] Foreign Application Priority Data

Oct. 10, 1973 [DE] Fed. Rep. of Germany ....... 2350833

[51] Int. Cl.² .............................................. F16L 11/00
[52] U.S. Cl. ................................................... 138/131
[58] Field of Search ......................... 138/129, 118, 131

[56] References Cited

U.S. PATENT DOCUMENTS 1,953,915  4/1934  Burgett et al. ................... 138/131 X
2,180,442  11/1939  Tondeur ........................... 138/131 X

*Primary Examiner*—Houston S. Bell, Jr.
*Assistant Examiner*—John W. Shepperd
*Attorney, Agent, or Firm*—Sherman & Shalloway

[57] ABSTRACT

A heavy duty conduit is disclosed for services such as oxygen supply to lances and torches and includes plural metallic strands which are twisted together with a central channel therein to form a duct for the gaseous medium, an impervious sheath enclosing the duct, and a helical insert in the central flow channel of the duct to preclude inward shifting of the strands and consequent disturbance of the flow channel and to provide turbulent flow of the gaseous medium therethrough.

3 Claims, 2 Drawing Figures

REINFORCED FLEXIBLE CONDUIT AND METHOD OF MANUFACTURE

BACKGROUND OF THE INVENTION

The present invention relates to flexible conduits and is concerned, more particularly, with a flexible gas conduit for heavy duty services in which the uniformity of the gas-flow passage is maintained against external influences by a stable inner structure.

BRIEF DESCRIPTION OF THE PRIOR ART

Heavy duty, flexible conduits are of particular importance to burning or cutting with oxygen, especially when the burning zone is in a remote or poorly accessible spot. For example, in burning or cutting under water, the flexible conduits are subject to differing hydraulic pressure along their lengths, according to the depth below the surface, and water currents and obstructions may interfere with the smooth course of the conduit. Collapse or kinking of such conduits either disturbs the torch performance or actually extinguishes a torch, if the flow of gas is cut off or drastically changed.

Conduits have been used, for this and similar services, which incorporate a tubular duct formed of a plurality of metallic strands, similar to wire ropes, which are twisted together into an elongated duct having a central channel for the flow of the gases from the receiving end of the conduit to the junction with the torch or lance.

A known method of forming such twisted ducts has included a mandrel or plug about which the strands are mutually twisted, the inner clearance or gas channel thus being formed by the presence of the plug, which is an integral component of the twisting apparatus. Once it is thus formed, the central gas channel lacks any inner reinforcement to maintain the cross-sectional area formed by the forming plug.

In this method of forming such conduits, the problem of a shrinking or reduction of the cross-sectional area of the inner channel has been encountered. This may occur, for example, as a consequence of the elasticity or resilience of the material or from external mechanical influences which may loosen or disturb the twist formed by the strands.

This reduction of the cross-sectional area of the gas channel disturbs the flow of oxygen or gas to the burning tip, thereby requiring a higher pressure to deliver the requisite amount for efficient combustion.

When such cross-sectional reduction is compensated for by increasing the size of the channel as it is originally formed, the cost is considerably increased and the flexibility of the conduit is lessened.

Another known method for making reinforced flexible conduits is the twisted duct is formed of a wire twisted into a helix with its adjacent coils touching, such as in the sleeve of a Bowden cable. Such ducts must be formed at lower feed rates than are usable in winding twist-strand ducts.

The known conduits have not been found to be entirely satisfactory, as well as the prior methods for manufacturing twisted-strand ducts.

SUMMARY OF THE INVENTION

In general, the preferred form of the present invention comprises a twisted-strand duct having a surrounding shroud, a central channel and a spiral insert within the central channel.

In general, the preferred method of the present invention comprises twisting a length of metal into a helix and twisting a plurality of strands against the exterior of the helix to form a twisted-strand duct surrounding the helix.

OBJECTS OF THE INVENTION

It is an object of the present invention to provide a flexible conduit having a stable cross-sectional area for the flow of fluids therethrough.

Another object of the present invention is the provision of a flexible conduit for gases having a reinforcing member for retaining the desired cross-sectional area of the gas-flow channel.

It is another object of the present invention to provide a flexible conduit for gases having a twisted-strand duct having a central channel therein, and a helical member in the central channel to reinforce the inner wall of the channel and to present a rifled inner wall surface to the flowing gas.

Another object of the present invention is the provision of a method for forming internally-reinforced, twisted-strand ducts for flexible conduits.

A further object of the present invention is the provision of a method for assembling a reinforcing insert in a twisted-strand duct for flexible conduits.

A still further object of the present invention is the provision of a method for simultaneously forming and assembling a helical insert in a twisted-strand duct for flexible conduits.

BRIEF DESCRIPTION OF THE DRAWINGS

These and other objects of the invention will be apparent from the following description and accompanying drawings, in which.

DETAILED DESCRIPTION OF THE PREFERRED EMBODIMENT

Figures 1, 2:
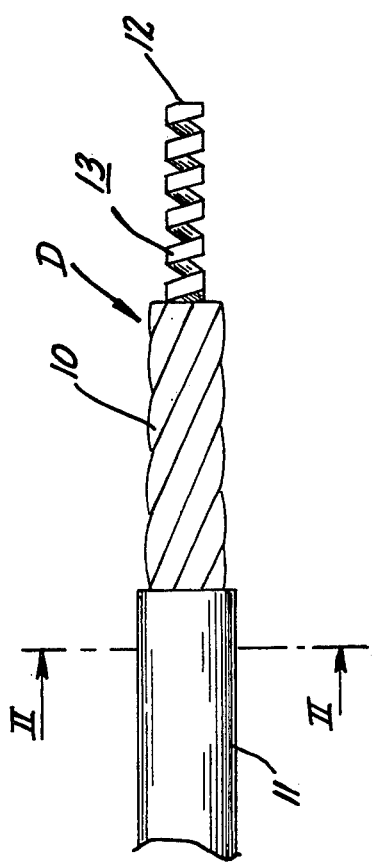
FIG. 1 is a side view, progressively cut away, of the preferred form of conduit of the present invention.
FIG. 2 is a sectional view taken along lines II—II of FIG. 1.

As shown in the drawings, the preferred conduit of the present invention comprises a twisted-strand duct "D", formed of a plurality of strands 10 of metal, and forming a central channel 12 for the flow of gas therethrough. The duct "D" is enclosed by a tubular shroud 11 of a suitable synthetic or rubberlike material.

The central channel 12 has a helical insert 13 therein which abuts the inner wall of the channel and is loosely twisted to provide a gap or clearance between adjacent coils of the helix both for flexibility and for an effect on the gas flow, as will be discussed more fully hereinafter.

It is apparent that the insert 13 reinforces the duct "D", ensuring the proper cross-sectional area for flow of the oxygen or gas therethrough.

However, when the preferred conduit of the present invention is used to deliver oxygen to a torch or lance, an additional advantage is achieved by reason of the effect of the conduit on the flow characteristics of the gas. The open spiral or helix of the insert 13 allows the oxygen to penetrate to the open zone between the individual strands 10 of the duct "D". The discontinuous surface formed by the helical insert 13 causes a turbulence in the flow of oxygen which has been formed to improve the combustion at the burning zone.

This turbulence effect is enhanced if the oxygen is able to penetrate the duct "D". This is especially true if the strands 10 are themselves formed of individual wires, in which case an especially efficient combustion is obtained. The penetration of the oxygen into the twisted-strand duct is not problematical, since the sealing shroud 11 confines the gas from escaping.

It is to be understood, however, that the advantages to be derived from the flexible conduit of the present invention are not limited to its use with oxygen. The new conduit is effective for handling any gaseous medium independent of flowrates, cross-sectional area, or the number of strands forming the duct. Also, it is to be understood that the strands 10 may themselves be formed of multiple wires.

Also, instead of the helical insert shown, the reinforcing insert may have another form of discontinuous surface such as a tube having apertures therein which open to the stranded duct. These will serve when the stranded duct is relatively thin or the gas pressure is comparatively high.

DESCRIPTION OF THE PREFERRED METHOD

The preferred method of forming the duct of the present invention comprises winding a wire or a metal strip into a cylindrical sleeve and forming a twist-strand duct against the outer surface of the sleeve, which is stretched to provide an axial clearance between adjacent coils.

This method may be carried out on conventional equipment suitable for making such twist forms. A tightly-wound sleeve having abutting coils, as in a Bowden cable, and of appropriate diameter, is fed to the winding unit and acts as a forming surface for the strand-duct being twisted. The feed rate of the inner sleeve is kept at a rate lower than that of the strands so that the formerly-abutting coils of the sleeve are stretched axially to produce a helix with clearance between the coils, as shown in FIG. 1.

This method provides an optimum uniformity in the helix produced in the insert 13. It is particularly effective in producing the clearance between adjacent coils of the insert, not as an additional step in the process, but simultaneously with and in lengths equivalent to the length of the twisted-strand duct.

Various changes may be made in the details of the invention, as disclosed, without sacrificing the advantages thereof or departing from the scope of the appended claims.

What is claimed is:
1. A flexible conduit for conducting oxygen and for combustion therewith including
    (a) a plurality of metallic strands twisted together to form
    (b) a stranded duct having
    (c) a central channel therein access means for providing access for oxygen within said central channel to penetrate the stranded duct, said access means including
    (d) a helical metal insert in said central channel, said insert being sized to abut against the surface of the central channel and having adjacent windings thereof axially spaced from each other to form
    (e) a discontinuous helical surface, and
    (f) a gas impervious sheath enclosing said stranded duct.
2. The flexible conduit of claim 1 in which the insert is formed of wire.
3. The flexible conduit of claim 1 in which the insert is formed of metal strip.

* * * * *